No. 836,548. PATENTED NOV. 20, 1906.
W. J. WATSON.
SMELTING FURNACE.
APPLICATION FILED AUG. 6, 1906.

2 SHEETS—SHEET 1.

WITNESSES:
John T. Schrott.
F. C. Gibson.

INVENTOR
William J. Watson
BY
Fred G. Dieterich
ATTORNEY.

No. 836,548. PATENTED NOV. 20, 1906.
W. J. WATSON.
SMELTING FURNACE.
APPLICATION FILED AUG. 6, 1906.

2 SHEETS—SHEET 2.

WITNESSES:
John T. Schrott
F. C. Gibson

INVENTOR
William J. Watson.
BY Fred G. Dieterich
ATTORNEY

UNITED STATES PATENT OFFICE.

WILLIAM J. WATSON, OF LADYSMITH, BRITISH COLUMBIA, CANADA.

SMELTING-FURNACE.

No. 836,548.  Specification of Letters Patent.  Patented Nov. 20, 1906.

Application filed August 6, 1906. Serial No. 329,454.

*To all whom it may concern:*

Be it known that I, WILLIAM J. WATSON, a citizen of the Dominion of Canada, residing at the town of Ladysmith, in the Province of British Columbia, Canada, have invented new and useful Improvements in Smelter-Furnaces, of which the following is a specification.

This invention consists of an improved smelting-furnace designed for the production of a high-grade matte or a blister-copper direct from sulfid ores without the necessity for preliminary roasting or subsequent re-smelting.

My effort has been directed to so construct the furnace that the first fusion of the ore will take place in one division of it where the lighter impurities will be slagged off, and the matte formed here will flow by gravity into another division, where it will be blown up by a high-pressure blast, and silica or a silicious ore being added the sulfur iron and other impurities will be oxidized and slagged off, leaving a high-grade matte or if the process of conversion be continued far enough blister-copper.

The operation in this secondary division does not require the addition of other fuel than is furnished by the oxidation by the blast of the sulfur, iron, &c., and the combination of the iron oxid with the silica.

The advantage will be manifest of being able to conduct this secondary refining of the matte as a continuous process without a further addition of fuel, besides which by the addition of the required silica as a flux into the secondary division of the furnace I am enabled to conduct the refining operation without the necessity of a silicious lining to the furnace.

There are also several other novel features in my invention to which attention is drawn in the following specification, reference being made to the drawings by which it is accompanied, in which—

Figure 1:
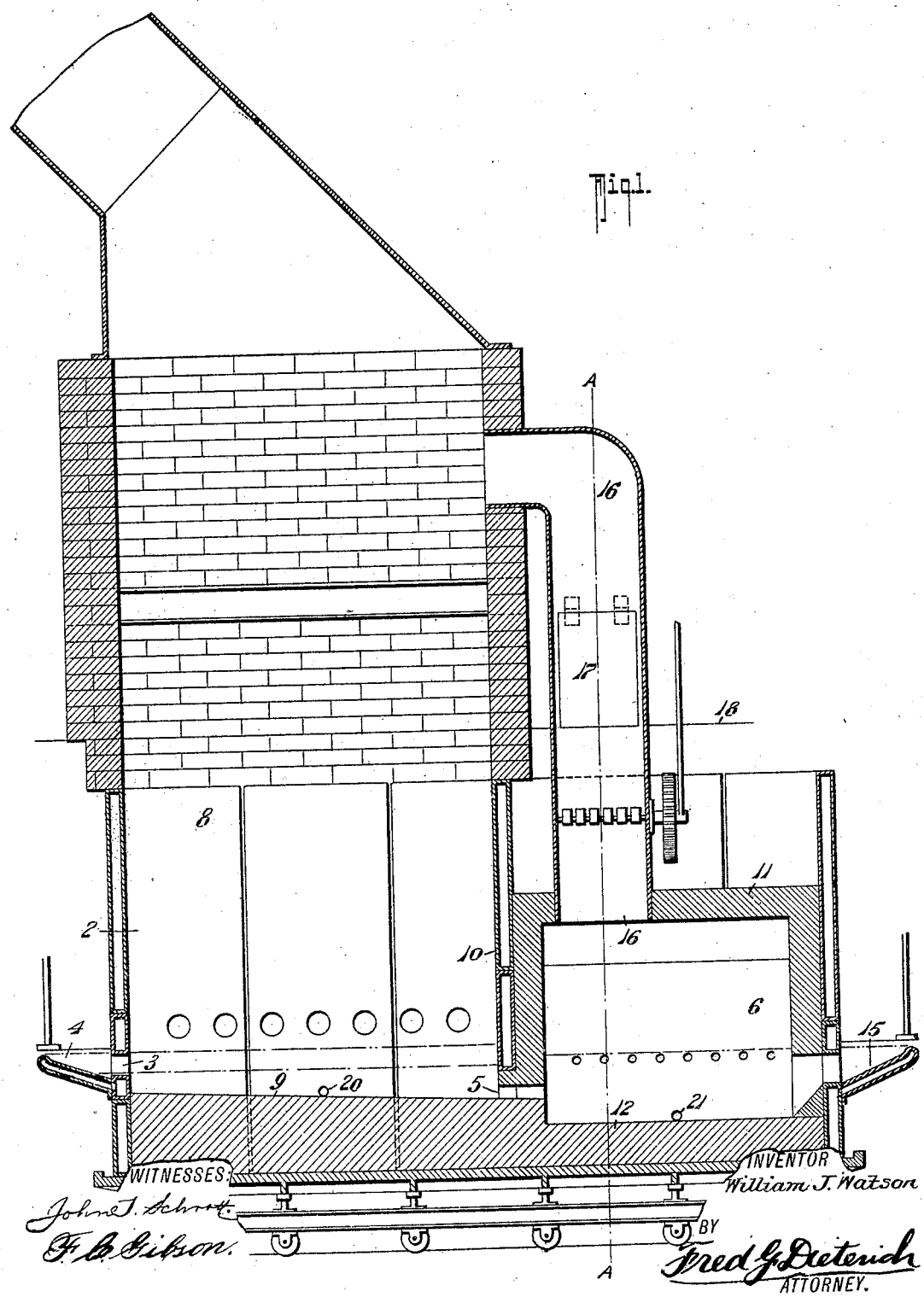
Figure 2:
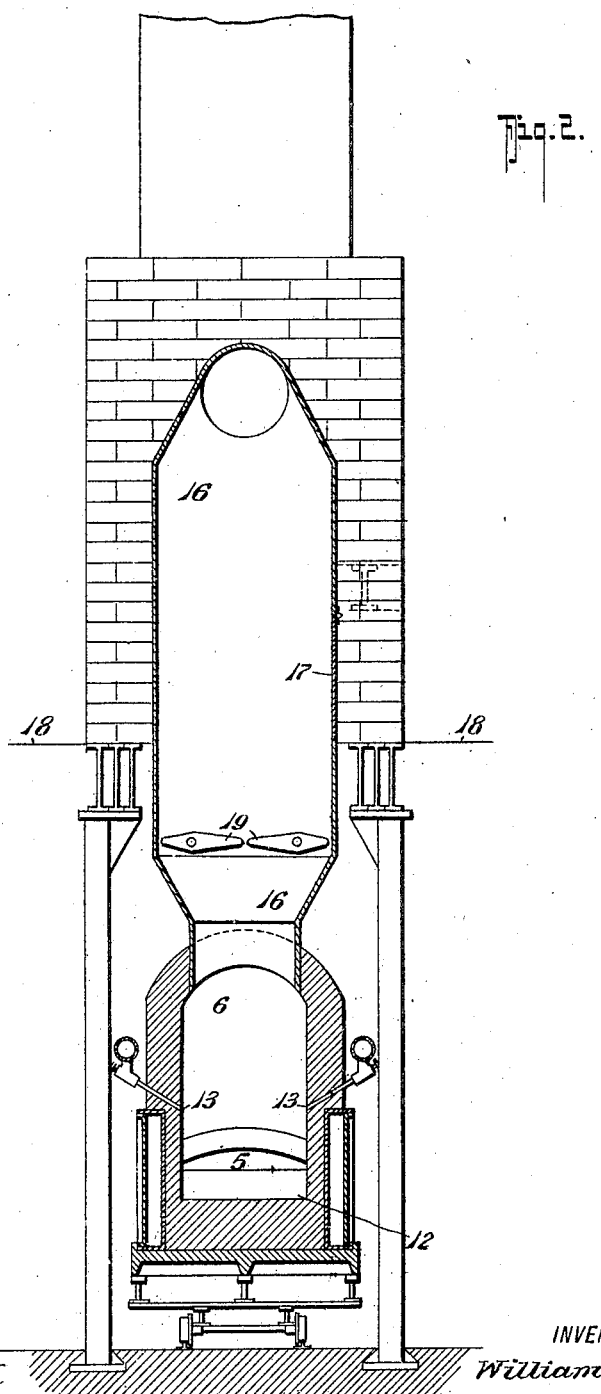

Figure 1 is a vertical longitudinal section through both divisions of the furnace, and Fig. 2 a vertical cross-section through the secondary or refining division on the line A A in Fig. 1.

In the drawings, 2 represents the matting-division of the furnace, the walls of which are water-jacketed, as shown, bronze sections being introduced where apertures are required, as at 3, for the water-jacketed slag-spout 4 and at the passage 5 to the secondary or refining division 6. The customary blast-twyers 7 are introduced in the jacketed side walls 8, and the bottom 9 is downwardly sloped from the slag-outlet 3 to the passage 5 in the opposite side, which passage may be arched and lined with fire-brick, as shown.

The secondary or refining division 6 is merely a continuation of the matting-furnace 2, separated therefrom by the water-jacketed partition 10; but as the combustion conducted therein is derived merely from the oxidizable constituents of the matte this refining-division is lined throughout with basic fire-brick to reduce radiation, and the arched roof 11 of this furnace 6 is kept down as low as possible to hold the heat in close proximity to the charge of matte within.

The bottom 12 is below the level of that of the furnace 2, either dropped, as shown in Fig. 1 of the drawings, or the slope of the bottom of the furnace 2 is continued uniformly to the farther end of 6.

The side walls of 6 are penetrated with high-pressure blast-twyers 13, downwardly directed inward, so that the inner ends of them are just beneath the level of the matte, so as to effectually act upon it for purposes of oxidation.

The secondary division 6 of the furnace is provided opposite to the passage 5 with a water-jacketed spout 15, the level of which is as much below the slag-spout 3 of the matting-division 2 of the furnace as the balance level of the more dense matte in the division 6 is below that of the lighter matte and slag in the division 2.

In the roof 11 of the division 6 is a flue 16 for the escape of the furnace-gases, and through this flue 16 silica or silicious ore to form the desired flux is charged through a door 17 in the level of the charging-floor 18. The ore charged through this door is deposited upon a tilting grate 19, on which it is allowed to rest until required. The ore thus becomes heated and all moisture expelled by the passage of the furnace-gases through it before it is dropped into the furnace.

In the operation of this furnace the ore under the low-pressure blast will be matted with or without the use of fuel in the furnace 2, and the matte will flow through the passage 5 into the division 6, where under the action of the high-pressure blast the sulfur, iron, &c., will be oxidized and will be respectively vaporized or slagged off by the silicious flux added through the door 17, combustion being maintained by the oxidation of the sulfur and iron and the combination of the iron oxid with the silicious flux. The matting-slag will flow off through the slag-spout 4, while the refined matte and the slag made in refining will overflow at the spout 15.

Tapping-holes 20 and 21 may be furnished in the divisions 2 and 6 for drawing off the contents of the furnace when required.

Although I have described and illustrated my furnace as one having two divisions separated by the jacketed partition 10, it must be distinctly understood that the secondary or refining furnace may be added to an existing matting-furnace, so long as the principles of its construction herein described are maintained. These principles are a secondary chamber in communication at the floor-level with a matting-furnace, such chamber lined with basic refractory material and having high-pressure blast-conversion twyers, a low roof confining the heat in contact with the matte, a spout the delivery edge of which is the required distance below the slag-spout of the matting-furnace, a flue for carrying off the products of combustion, and means for charging a silicious flux into the secondary matte-containing chamber.

I am aware that attempts have previously been made to effect the matte making and refining side by side in one furnace by the introduction of converting-twyers under the matting-twyers, but such attempts have not proved successful, because no effort has been made to effect the separation of the charge from the matte on which the conversion or secondary refining is to be performed. Under these circumstances the superincumbent weight of the charge presses the semifused portions of it into the fluid matte and prevents the circulation of it, without which the desired operation of conversion is not satisfactorily performed. It is to avoid this that I introduce the partition 10 and provide means whereby the matting charge will be retained in the matting portion of the furnace while the fluid matte is allowed to pass to the secondary division for conversion and refining by the high-pressure blast and the addition of a silicious flux.

Where considered desirable, the furnace may be used for the production of blister-copper by a suitable increase in the use of the high-blast twyers 13 to insure more complete oxidation of the impurities in the matte, in which case the copper will be drawn off through the tapping-hole 21 and the slag made in refining will be allowed to flow out at the spout 15.

Having now particularly described my invention and the manner of its operation and use, I hereby declare that what I claim as new, and desire to be protected in by Letters Patent, is—

1. In a smelting-furnace for the reduction of sulfid ores the combination with a matting-chamber provided with low-pressure twyers and a slag-spout, of a refining-chamber separated from the aforementioned chamber by a partition having a passage therethrough at the level of the bottom, said refining-chamber having a basic lining and high-pressure twyers relatively lower than the twyers of the matting-chamber, and an overflow-spout relatively lower than the slag-spout of the matting-chamber.

2. In a smelting-furnace of the class described, the combination with a matting-chamber having matting-twyers and a slag-spout, of a bottom downwardly sloping therefrom to a relatively low passage at the level of the bottom, a refining-chamber in connection with the foregoing through said passage, said refining-chamber having a basic lining, an overflow-spout lower than the slag-spout in the matting-chamber, converting-twyers downwardly directed inward, means for conveying away the furnace-gases from both chambers and means for charging ore into each.

3. In a smelting-furnace of the class described, the combination with a matting-chamber having matting-twyers and a slag-spout, a bottom downwardly sloping therefrom to a relatively low passage in the level of the bottom, a refining-chamber with which said passage connects said refining-chamber having a basic lining and a relatively low arched roof, an overflow-spout lower than the slag-spout of the matting-chamber, converting-twyers below the level of the matting-twyers of the other chamber, a flue to carry off the furnace-gases, a tilting-grate in such flue, and means for charging ore thereupon.

In testimony whereof I have signed my name to this specification in the presence of two subscribing witnesses.

WILLIAM J. WATSON.

Witnesses:
 HARTLEY GISBORNE,
 HENRY COLLINSON.